US009455903B2

(12) United States Patent
Hui et al.

(10) Patent No.: US 9,455,903 B2
(45) Date of Patent: Sep. 27, 2016

(54) RECORDING PACKET ROUTES USING BLOOM FILTERS

(75) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 446 days.

(21) Appl. No.: 13/563,573

(22) Filed: Jul. 31, 2012

(65) Prior Publication Data

US 2014/0036908 A1 Feb. 6, 2014

(51) Int. Cl.
*H04L 12/733* (2013.01)
*H04L 12/721* (2013.01)
*H04L 12/741* (2013.01)
*H04W 40/28* (2009.01)

(52) U.S. Cl.
CPC ............. *H04L 45/20* (2013.01); *H04L 45/34* (2013.01); *H04L 45/74* (2013.01); *H04W 40/28* (2013.01)

(58) Field of Classification Search
CPC ......... H04B 7/00; H04L 12/56; H04L 40/16; H04L 45/10; G06F 9/46; G06F 9/467
See application file for complete search history.

(56) References Cited

U.S. PATENT DOCUMENTS

| 7,821,970 | B2 | 10/2010 | White et al. | |
| 7,852,751 | B2 | 12/2010 | Bryant et al. | |
| 8,000,337 | B2 | 8/2011 | Saha | |
| 8,291,112 | B2 | 10/2012 | Vasseur et al. | |
| 2001/0032271 | A1* | 10/2001 | Allen | H04L 45/00 709/239 |
| 2008/0002599 | A1* | 1/2008 | Yau et al. | 370/310 |
| 2009/0183159 | A1* | 7/2009 | Michael | G06F 9/467 718/101 |
| 2012/0099587 | A1* | 4/2012 | Fan | H04W 40/16 370/389 |
| 2012/0300781 | A1* | 11/2012 | Sarela et al. | 370/392 |

OTHER PUBLICATIONS

Awduche, et al., "RSVP-TE: Extensions to RSVP for LSP Tunnels", IETF Trust, Network Working Group, Request for Comments 3209, Dec. 2001, 62 pages.
Gnawali, et al., "The Minimum Rank Objective Function with Hysteresis", draft-ieft-roll-minrank-hysteresis-of-04, IETF Trust, Internet-Draft, May 2011, 11 pages.
Hui, et al., "An IPv6 Routing Header for Source Routes with the Routing Protocol for Low-Power and Lossy Networks (RPL)", IETF Trust, Request for Comments 6554, Mar. 2012, 14 pages.
Thubert, "RPL Objective Function 0", <draft-ietf-roll-of0-15>, IETF Trust, Internet Draft, Jul. 2011, pp. 1-14.

(Continued)

*Primary Examiner* — Andrew Lai
*Assistant Examiner* — Leon Andrews
(74) *Attorney, Agent, or Firm* — Parker Ibrahim & Berg LLC; James M. Behmke; Stephen D. LeBarron (57) ABSTRACT

In one embodiment, a Bloom filter is provided in a data packet signal functional to preferably encode the identifier of each nodal device and record the nodal hop count the signal traverses across in a computer network. The Bloom filter provided in a data packet signal has one or more fields. The recorded nodal path may updated en-route as the data packet traverses a nodal path in the computer network and/or the order of nodes traversed by the data packet in the computer network are encoded in the bloom filter.

15 Claims, 5 Drawing Sheets

(56) References Cited

OTHER PUBLICATIONS

Vasseur, et al., "Routing Metrics Used for Path Calculation in Low Power and Lossy Networks" <draft-ietf-roll-routing-metrics-19, IETF Trust, Network Wiorking Group, Internet Draft, Mar. 2011, pp. 1-31.

Winter, et al., "RPL: IPv6 Routing Protocol for Low-Power and Lossy Networks", IETF Trust, Request for Comments 6550, Mar. 2012, 158 pages.

Castelluccia, C., "Hash-Based Dynamic Source Routing (HB-DSR)", Rapport de Recherche, Mar. 2003, No. 4784, 21 pages, INRIA, Montbonnot-St-Martin, France.

Snoeren, et al., "Hash-Based IP Traceback", SIGCOMM '01, Aug. 2001, 12 pages, ACM, San Diego, CA.

Whitaker, et al., "Forwarding Without Loops in Icarus", Open Architectures and Network Programming Proceedings, 2002, pp. 63-75, IEEE.

\* cited by examiner

RECORDING PACKET ROUTES USING BLOOM FILTERS

TECHNICAL FIELD

The present disclosure relates generally to computer networks, and, more particularly, to a bloom filter used with data packets to record packet routes.

BACKGROUND

Low power and Lossy Networks (LLNs), e.g., sensor networks, have a myriad of applications, such as Smart Grid and Smart Cities. Low-power and Lossy Networks (LLNs) may be used in a variety of applications (e.g. smart grids, smart cities, home, and building automation). Various challenges are presented with LLNs, such as lossy links, low bandwidth, battery operation, low memory and/or processing capability, etc. It is to be understood LLNs typically communicate over a physical medium that is affected by environmental conditions that often change over time. For instance, examples include temporal changes in interference (e.g. other wireless networks or electrical appliances), physical obstruction (e.g. doors opening/closing or seasonal changes in foliage density of trees), and propagation characteristics of the physical media (e.g. temperature or humidity changes). It is to be appreciated time scales of such temporal changes can vary widely e.g., between milliseconds (e.g. transmissions from other transceivers) to months (e.g. seasonal changes of outdoor environment).

It is further noted that low-cost and low-power designs limit the capabilities of transceivers in LLNs. This is because LLN transceivers typically provide low throughput. Furthermore, LLN transceivers typically support limited link margin, making the effects of interference and environmental changes visible to link and network protocols.

One attempt to overcome the above noted shortcomings was to use Record Route, which essentially is a method that records the path that a packet traverses within the packet itself. The Record Route not only identifies the set of routers/interfaces that a packet visits, but also the relative order. Existing protocols that specify Record Route functionality encode the path as a list of addresses/identifiers. Each node that forwards a packet with record route functionality is responsible for adding its own address to the packet before forwarding. It is pointed out a number of protocols utilize Record Route to help support routing and network management. For instance, IPv4 specifies Record Route functionality with IP option 7. IPv6 specifies Record Route functionality with IPv6 Routing Header 0 (now deprecated) and the RPL Routing Header (RFC 6554). Other protocols such as RSVP-TE (RFC3209) specifies Record Route objects (RRO) that operates similarly in order to set up Label Switched Traffic Engineering Label Switched Path.

Several routing protocols designed for mesh networking typically use Record Route (often called path accumulation) to support the route discovery and repair process. Proactive protocols may also use Record Route to inform the DAG root of the topology. In particular, routers generate and send routing control packets (similar to DAO messages in RPL) towards the root. Each router along the way adds its identifier to the Record Route list. When the root receives the message, it then has a complete path that it can use for source routing. It is to be appreciated that while early versions of RPL included Path Accumulation for DAO messages, recording full IPv6 addresses was deemed too expensive and dropped from the specification. Reactive protocols (e.g., Dynamic Source Routing) use Record Route functionality during the route discovery and repair process. In particular, when flooding a Route Request (RREQ), routers forwarding the RREQ add their identifier to the list. When the target receives the RREQ, it sends a RREP back to the originator with a copy of the recorded route. When the originator receives the RREP, it then has a complete path to the target that it can use for source routing.

However, since LLNs have limited resources which to operate with, Record Route mechanisms are often prohibitively expensive. The primary challenge is that each entry in the Record Route list must be large enough to encode the identifier. For example, when using 16-byte IPv6 addresses, a Record Route with ten hops will consume 160 bytes. Such overhead increases channel utilization, energy consumption, and latency while reducing overall packet success rates. Furthermore, this may require packet fragmentation, which is always undesirable. Another challenge is that some protocol architectures require the source to allocate the list within the packet, that is, routers along the way cannot expand the Record Route header to add additional entries. For example, IPv6 does not allow intermediate routers to alter the size of an IPv6 datagram, otherwise this would cause Path MTU Discovery issues.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments, a Bloom filter is provided in a data packet signal functional to preferably encode the identifier of each nodal device and record the nodal hop counts the signal traverses across a computer network. The bloom filter provided in a data packet signal has one or more fields. The recorded nodal path in some embodiments may updated en-route as the data packet traverses a nodal path in the computer network and/or the order of nodes traversed by the data packet in the computer network are encoded in the bloom filter. The Bloom filter preferably includes the following fields: a hop count field indicative of the number of nodal hops the data packet has traveled from a source node; an integer K indicative of the number of hash functions to use for the bloom filter; and a bit-vector field for encoding the bloom filter.

In some embodiments a source node is operative for determining the bit-vector field with the source node further determining the integer K. The source node may further determine the bit-vector field based on an expected nodal path length for the data packet and/or determines the bit-vector field based on a desired false positive rate for the bloom filter. In other embodiments the integer K is determined based on the bit-vector field or is determined as the data packet traverses across a nodal path in the computer network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
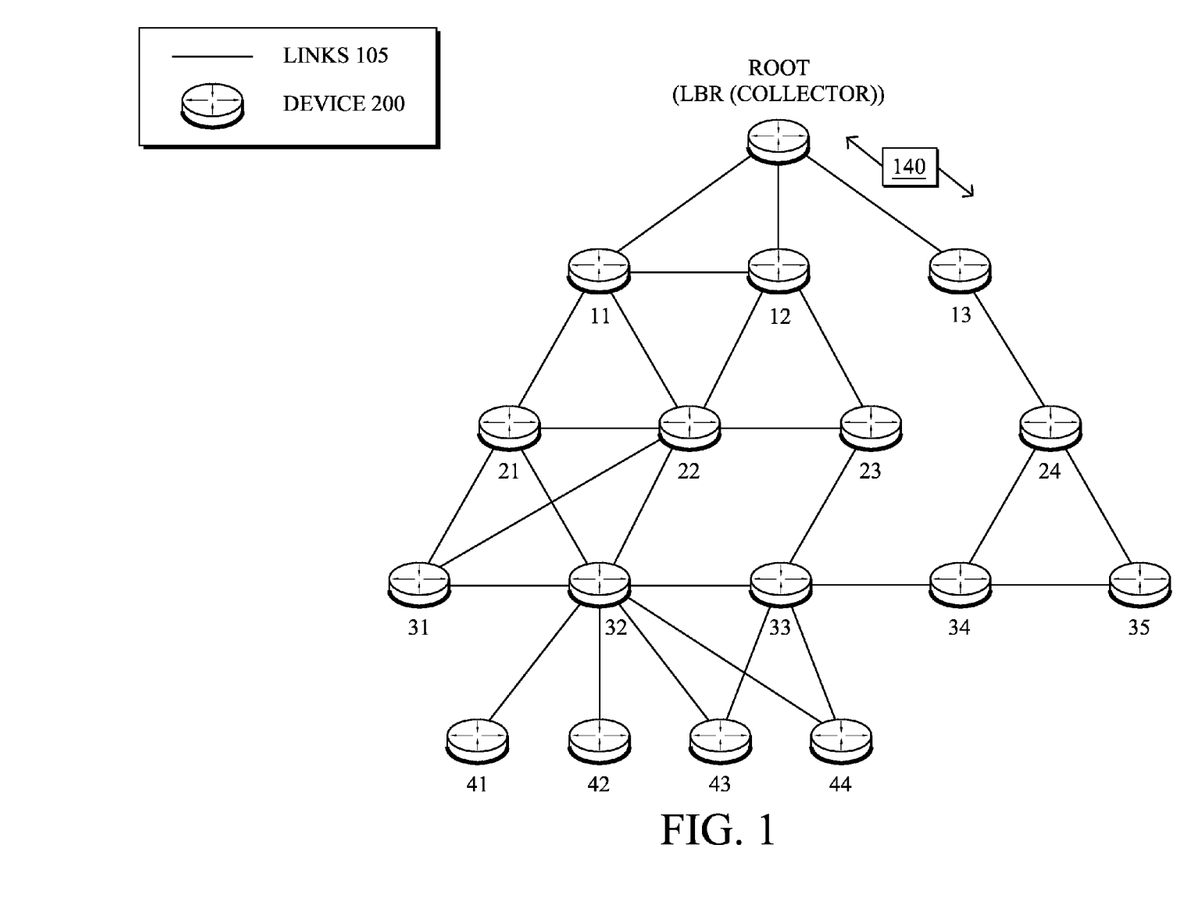
FIG. 1 illustrates an example loosely routed communication network.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
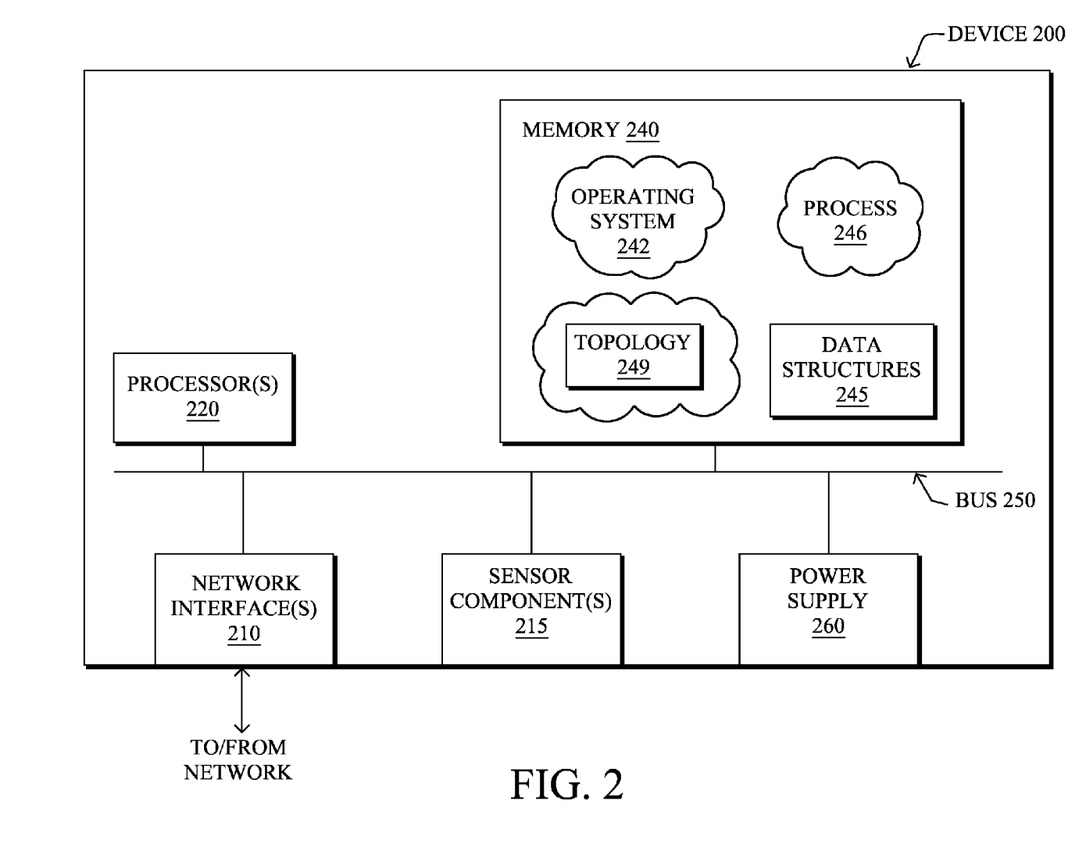
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise Bloom filter routing process/services 246.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example OF (e.g., a default OF) may be found in an IETF Internet Draft, entitled "RPL is Objective Function 0" <draft-ietf-roll-of0-15> by Thubert (Jul. 8, 2011 version) and "The Minimum Rank Objective Function with Hysteresis" <draft-ietf-roll-min-rank-hysteresis-of-04> by O. Gnawali et al. (May 17, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
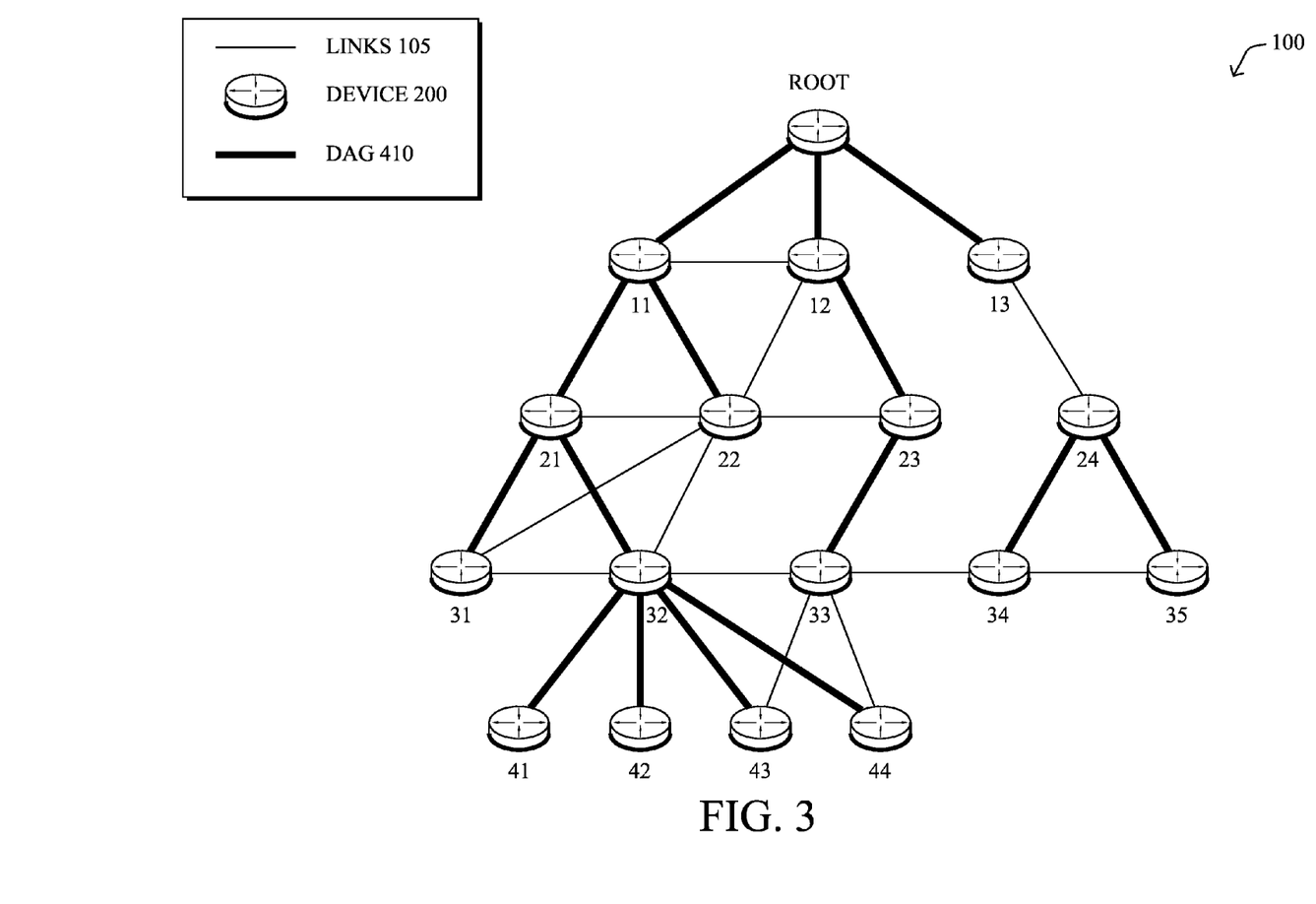
FIG. 3 illustrates an example simplified DAG.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links Rh in the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Figure 4:
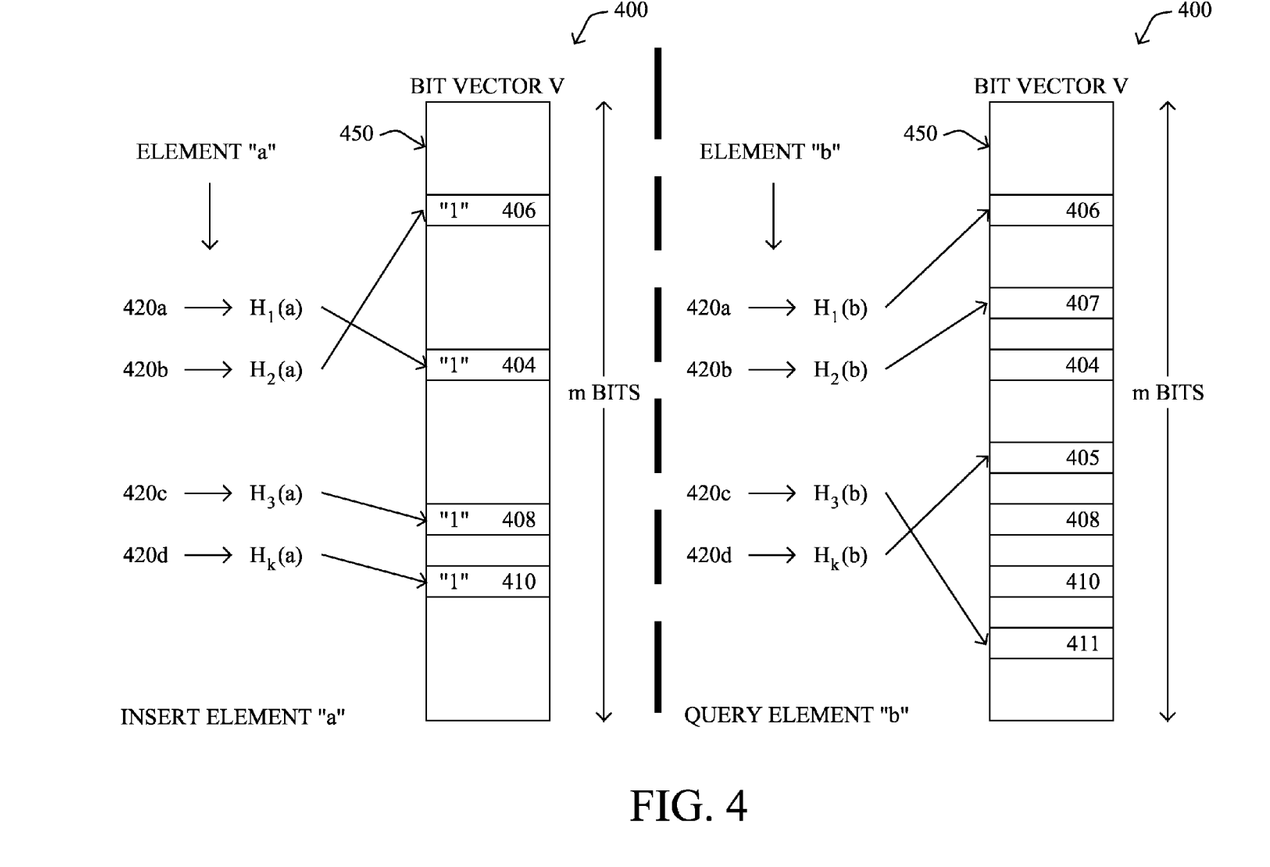
FIG. 4 illustrates a Bloom filter.

With reference now to FIG. 4, illustrated is an example of a Bloom filter 400 with four hash functions 420a-420d. As understood by one skilled in the art, Bloom filter 400 allocates a vector v of m bits, initially all set to 0, and then choose k independent hash functions, h1, h2, . . . , hk, each with range $\{1, \ldots, m\}$.

The Bloom filter 400 illustrated in FIG. 4 is shown implemented with a multi-ported memory 450, where the memory 450 has k ports. In this manner, the k array positions 404, 406, 408, 410 of the memory 450 may be written or queried in parallel.

The left-hand side of FIG. 4 illustrates insertion of an element (a) into a set (A). To insert an element a member A, the bits (404, 406, 408, 410, respectively) at positions h1(a), h2(a), . . . , hk(a) in v are set to "1". (A particular bit might be set to "1" multiple times). It should be understood that "1" or "true" as used herein is not intended to be limited to any particular value. For at least one embodiment, the value "1" is implemented as a one-bit logic-high value. However, this example embodiment should not be taken to be limiting. Instead, for alternative embodiments the "1" value may be a logic-low value or may be a multi-bit value.

The right-hand side of FIG. 4 illustrates a query to determine if an element (b) is a member of the set (A). FIG. 4 illustrates that, to query for an element (to test if it is in set A), the element is fed into each of the k hash functions, resulting in k bit positions. Given a query for b, the bits (406, 407, 411, 405, respectively) at positions h1(b), h2(b), . . . , hk(b) are checked. Again, because the Bloom filter 400 illustrated in FIG. 4 is implemented with a k-ported memory 450, the k array positions (positions h1(b), h2(b), . . . , hk(b)) may be checked in parallel.

If any of the bits is "0", then b is not in the set A. (If the element were in the set, then presumably all such bits would have been set to "1" when the element was added to the set). Otherwise, if all bits are "1", then either the element is in the set, or the bits have been set to "1" during the insertion of other elements. Thus, if all bits are set to "1", it may be assumed that b is in the set although there is a certain probability that this is not true (because the bits may have been set during the insertion of other elements). The (relatively rare) case in which the bits are set for the insertion of other elements, is called a "false positive" or "false drop", when the query erroneously indicates membership in the set for element b.

In summary, a Bloom filter is a space-efficient probabilistic data structure that is used to test whether an element is a member of a set. Typically, an empty Bloom filter is a bit-vector of m bits, all set to 0 wherein there is k different hash functions defined, each of which maps an element to one of the m array positions with a uniform random distribution. To add an element to the Bloom filter, feed it to each of the k hash functions to get k array positions and set them to 1. To test whether an element is in the set, feed it to each of the k hash functions to get k array positions. If any are 0, then the element is not in the set. If all are 1, then either the element is in the set or may indicate a false positive. Again, false positives are possible, but false negatives are not. The bit-vector size depends on the number of inserted elements and desired false positive rate. For instance, a typically Bloom filters uses 1.44*log_2(1/r) bits of space per element, where r is the false positive rate of the Bloom filter. For example, to support r<1%, the Bloom filter requires 10 bits (1.125 bytes) per element. To support r<0.1%, the Bloom filter requires 15 bits (1.875 bytes) per element.

Illustratively, the techniques described herein may be performed by hardware, software, and/or firmware, such as in accordance with the Bloom filter routing process 246, which may contain computer executable instructions executed by the processor 220 (or independent processor of interfaces 210) to perform functions relating to the techniques described herein. For example, the techniques herein may be treated as extensions to conventional protocols, such as the one or more routing protocols (e.g., RPL) or other communication protocols, and as such, may be processed by similar components understood in the art that execute those protocols, accordingly.

It is to be appreciated that even though Bloom filters were developed with focus on the database community, Bloom filters have also been applied to networking in the areas of distributed caching, P2P networking, routing, and management. It is further to be appreciated that existing record route mechanisms all rely on a list of node identifiers that name the set of nodes and their relative order. In this regard, and preferably under the control of process 246 (FIG. 2), and in accordance with an illustrated embodiment, operationally, a Bloom filter is utilized and operative to compact data packet record route entries and allow recording arbitrary length record routes with a given fixed header size. Therefore, with only 1-2 bytes per entry (vs. 16 bytes per entry), Bloom filters significantly reduce the record route overhead. By operating on a fixed-size data structure, routers along the path of a computer network, such as an LLN, can continue to record information about the path even if the source did not correctly estimate the path length. It is to be understood encoding a signal includes maintaining a Bloom filter within the data packet itself which preferably encodes the identifier of each device along the signal path and their nodal hop counts. As discussed further below, an optional Record Route Bloom Filter (RRBF) extension enables a set of Explicit Identifiers to handle cases where the expected number of false positives at a given hop exceeds a certain threshold. The threshold may be statically configured or dynamically adjusted based on feedback from the root. The RRBF may then be used to reconstruct the path given a list of nodes/topology, to reduce the overhead of routing protocols that utilize path accumulation in their messaging, and identify nodes along a path that match some predicate (e.g. nodes experiencing congestion).

Figure 5:
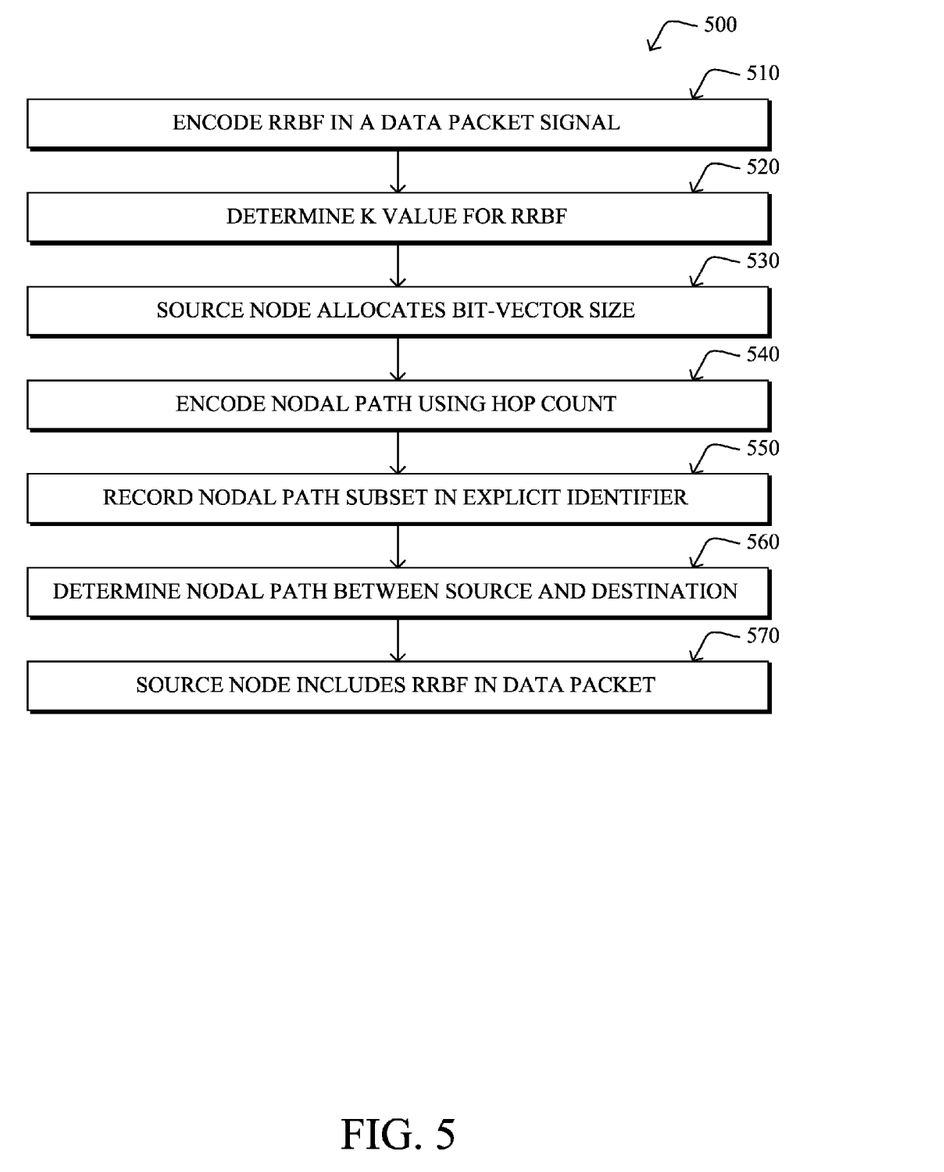
FIG. 5 illustrates an example simplified procedure for encoding a Bloom filter.

With reference to FIG. 5, illustrated is a simplified procedure 500, via process 246 (FIG. 2) for defining a variant of the Record Route encoding using Bloom filters, called the Record Route Bloom Filter (RRBF), as discussed herein below (step 510). In accordance with the illustrated embodiment, the RRBF preferably contains the following fields: 1) "Hop Count" indicative of the number of nodal hops the packet has traveled from a source node; 2) the integer "K" indicative of the number of hash functions to use for the encoded Bloom filter and 3) a Bit-Vector for encoding the Bloom filter. It is to be appreciated that when an RRBF is included in an IPv6 datagram, the RRBF may be encoded as an IPv6 Hop-by-Hop Option or an IPv6 Routing Header. When included in a RPL message, the RRBF may be encoded as a sub-TLV.

Each router along the nodal path increments the Hop Count field to record the number of hops the packet has traversed. When creating the RRBF, the source router preferably prescribes the value K (step 520). It is to be appreciated that given a bit-vector size and the number of expected elements, preferably a closed-form solution is used for computing the optimal set K. In one illustrated embodiment, the value K may be computed by the source node and included in the data packet. In another illustrated embodiment, the value K may be implicit based on the size of the bit-vector. In yet another illustrated embodiment, the value K may be configured over the network (e.g., distributed using the RPL protocol as a configuration parameter). Similarly, the set of hash functions may be configured on the node itself or over a network.

It is to be appreciated the source node is preferably responsible for allocating the size of the bit-vector used to encode the Bloom filter (step 530). As mentioned above, the false-positive rate of a Bloom filter is dependent on the number of entries and the size of the bit-vector. In accordance with an illustrated embodiment, a source node may determine the size of the bit-vector based on the expected nodal path length (i.e. number of entries) and the desired false positive rate. It is to be understood, the source node may obtain path length information from a routing protocol, traceroute, or by observing the IPv6 Hop Limit field when communicating with the destination. For instance, nodes may request in RPL DAO message to add the routing metric hops count in the DIO message sent to build the DODAG. The false positive rate that the source node uses may be configured for all traffic, based on the data packet's content, and/or contingent on the state of the node/network.

In accordance with the illustrated embodiment, the entire nodal path is preferably encoded using a single Bloom filter (BF) with N elements, where N is the number of nodal hops (step 540). When forwarding a data packet containing an RRBF, the router updates the Bloom filter by adding (Hop Count|Identifier) to the Bloom filter. It is to be appreciated concatenating Hop Count and the Identifier encodes relative ordering information within the Bloom filter. For instance, reference is provided to a data packet that has the path A→B→C→D, wherein:
  1) BF=0, node A initializes the BF and forwards the data packet to node B.
  2) BF|=Filter("1|B"), node B updates the BF with Hop Count=1 and Identifier=B.
  3) BF 1=Filter("2|C"), mode C updates the filter with Hop Count=2 and Identifier=C.
  4) node D receives the packet with the BF.

A noted advantage of the above described RRBF is its flexibility regarding the number of entries that it can contain (albeit at different false positive rates). For instance, the IPv6 architecture requires the packet length to remain unmodified as it travels through a network. In other words, the source node allocates the size of the record route header. When using traditional approaches, if the source does not allocate sufficient entries, the tail portion of the nodal path cannot be recorded. The source node often obtains an estimate of the path length from the routing protocol. However, it is to be understood the path length may not be accurate due to routing inconsistencies or any re-routing that may occur while forwarding the data packet. Thus, when using the RRBF in accordance with the illustrated embodiments, routers can continue to add entries to the Bloom filter even if the source node underestimated the path length.

In accordance with another illustrated embodiment, provided is a hybrid between recording a list of entries and maintaining a Bloom filter. As noted above, a known drawback of a Bloom filter is its vulnerability to false positives. It is to be understood the expected number of false positives for a given nodal hop is contingent upon the number of 1-hop neighbors present to the particular node. In an illustrated embodiment, the RRBF is extended to contain a list of Explicit Identifiers (EIDs). Thus, in contrast to a full record-route list, the EID list only specifies a subset of nodes along a nodal path. in the illustrated embodiment, an EID entry contains the current nodal Hop Count and the complete Identifier for the routing device. For instance, when the expected number of false positives exceeds a predetermined threshold, the router utilizes an aforesaid EID. The threshold is preferably determined based on the expected disadvantageous of incurring false positives. For example, when using the Bloom filter to reconstruct a path at the NMS (described below), the cost of a false positive may be very low since the information may only be used for rendering displays on the NMS GUI. In another illustrated embodiment, every N'th nodal hop may be identified to provide explicit information regarding the nodal path. For instance, provided below is an example of formatting a RRBF to include an EID list:

1) BF=0, EIDs={ }, node A initializes the BF and forwards the data packet to node B.
2) BF|=Filter("1|1B"), node B updates the filter with Hop Count=1 and Identifier=B.
3) EIDs+=(2, C), node C adds Identifier=C to the list of EIDs.
4) node D receives the packet with the BF.

It is to be appreciated that when using the RRBF information to reconstruct a recorded nodal path (as further discussed below), the false positive rate is experienced by the root rather than the router itself. In accordance with the above illustrated embodiment, the root may provide feedback to the node(s) on the false positive rates so that the node can adjust the size of the bloom filter.

In accordance with yet another illustrated embodiment, an RRBF is utilized to determine the nodal path that a packet traverses between a source node and a destination node (step 560). It is to be appreciated that knowing the nodal path a data packet traverses is advantageous, particularly in LLNs, where networks are dynamic and difficult to debug due to their scale and embedded nature. In one illustrated embodiment, the nodal path is recovered from the Bloom filter at the destination node and a list of nodes within the network (e.g., as obtained from DHCPv6, a routing protocol such as RPL, or a Network Management System). In operation, and starting with Hop Count=1, a determination is made as to which node in the list is resident in the Bloom filter, which is then repeated for each nodal Hop Count. The result will be the recorded nodal path.

It is to be understood that false-positives may indicate there may be more than one possible nodes for a given hop. In one illustrated embodiment, knowledge of network topology may be analyzed to filter out false-positive occurrences. For instance, a node at Hop Count=N must be a 1-hop neighbor of the node at Hop Count=N−1 and the node at Hop Count=N+1. It is to be understood that with sufficient memory on the NMS/Border Router, it is advantageous to pre-compute the Bloom filter hashes to reduce the cost of Bloom filter queries. The pre-computed Bloom filter hashes are preferably stored along with the routing information.

In accordance with yet another illustrated embodiment, an RRBF is utilized to reduce the overhead of routing protocols that rely on path accumulation. First, it is to be understood that RPL does not currently specify a Path Accumulation mode because recording a list of IPv6 addresses was determined to incur too much overhead. With regards to RPL, the DAO messages may include the RRBF as a sub-TLV and record the path towards the root. For reactive protocols, the route request (RREQ) messages may include the RRBF to record the path towards the target. In both cases, the recorded path is sent to a node (DAG root/Originator) that uses the recorded path to perform source routing. As known in the prior art, Hash-Based DSR proposes the use of Bloom filters to encode the source route, but still uses address lists for recording routes in the RREQ and route reply (RREP) messages. In contrast, in accordance with the present illustrated embodiment, the Hash-Based DSR is modified to utilize the RRBF rather than path accumulation. Hence, the result of a nodal route discovery procedure is that the source node obtains the RRBF, rather than merely a list of addresses. The source node then preferably includes the RRBF in data packets to deliver packets to the destination node rather than computing the Bloom filter from the RREP address list (step 570).

In accordance with still additional embodiments, it is to be appreciated the aforementioned RRBF may be used for additional purposes. It is to be understood that since a RRBF has such a compact nature (as discussed), they may additionally be utilized to record a subset of a nodal path in addition to recording the entire nodal path. In operation, the nodes chosen to be recorded along the nodal path are preferably determined by predicate. For instance, Explicit Congestion Notification (ECN) has been shown to be useful to indicate the presence of congestion along a path. However, because ECN is limited to a single bit, it does not indicate what node(s) along the path are experiencing congestion. Thus, in accordance with the present illustrated embodiment, the RRBF is augmented to preferably include an optional type field that indicates what type of nodes are to be recorded in the RRBF. Thus, the All-Nodes type would implement record route as described above and the Congestion Notification type would only record those nodes that are experiencing congestion. In yet another illustrated embodiment, the RRBF includes a predicate that defines the condition that a node should record itself in the RRBF. In general, being able to record the presence of some condition along with the node experiencing the condition is particularly advantageous in dynamic networks such as LLNs.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide a reduction in the cost of communicating record route information, such as providing a reduction in the cost of maintaining source route information in memory. This is because the above described RRBF typically requires only 1 to 2 bytes of overhead per entry for manageable false-positives rates, which is in contrast to 16 bytes per entry for IPv6 addresses or larger for other kinds of identifiers. Furthermore, because RRBF of the illustrated embodiments preferably operate on a fixed-sized data structure, routers along a nodal path can continue to record path information even if the source node does not correctly estimate the path length.

While there have been shown and described illustrative embodiments that provide for encoding bloom filters in a data packet to implement record route mechanisms in a compact format, it is to be understood that various other adaptations and modifications may be made within the spirit and scope of the embodiments herein. For example, the embodiments have been shown and described herein with relation to LLN networks. However, the embodiments in their broader sense are not as limited, and may, in fact, be used with other types of networks and/or routing protocols.

The foregoing description has been directed to specific illustrated embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
generating, by a network device having a memory and a processor in a computer network, a bloom filter in a data packet, wherein the bloom filter includes a hop count field that indicates a number of hops the data packet has travelled from a source network device, an integer K indicative of the number of hash functions to use for the bloom filter, and a bit-vector field for encoding the bloom filter; and
recording, by the network device, in the bloom filter an encoded identifier of each network device along a nodal path that the data packet traverses and a corresponding hop count from the source network device for each network device along the nodal path,
wherein the nodal path recorded in bloom filter is updated en-route as the data packet traverses the nodal path in the computer network,
wherein each network device along the nodal path increments the hop count field to record the number of hops the data packet traverses from the source network device to a destination network device.

2. The method of claim 1, wherein the order of network devices traversed by the data packet in the computer network are encoded in the bloom filter.

3. The method of claim 1, wherein the source network device determines the bit-vector field.

4. The method of claim 3, wherein the source network device determines the integer K.

5. The method of claim 3, wherein the source network device determines the bit-vector field based on an expected nodal path length for the data packet.

6. The method of claim 5, wherein the source network device further determines the bit-vector field based on a desired false positive rate for the bloom filter.

7. The method of claim 1, wherein the integer K is determined at least based on the bit-vector field.

8. The method of claim 1, wherein the integer K is determined as the data packet traverses across network devices in the computer network.

9. The method of claim 1, further including:
interpolating the bloom filter after the data packet has reached its destination network device to determine the nodal path the data packet traveled from the source network device to the destination network device.

10. An apparatus, comprising:
one or more network interfaces to communicate with a computer network;
a processor coupled to the network interfaces and adapted to execute one or more processes; and
a memory configured to store a process executable by the processor, the process when executed configured to:
generate a bloom filter in a data packet, wherein the bloom filter includes a hop count field that indicates a number of hops the data packet has travelled from a source network device, an integer K indicative of the number of hash functions to use for the bloom filter, and a bit-vector field for encoding the bloom filter; and
record in the bloom filter an encoded identifier of each network device along a nodal path that the data packet traverses and a corresponding hop count from a source network device for each network device along the nodal path,
wherein the nodal path recorded in bloom filter is updated en-route as the data packet traverses the nodal path in the computer network,
wherein each network device along the nodal path increments the hop count field to record the number of hops the data packet traverses from the source network device to a destination network device.

11. The apparatus as in claim 10 wherein the computer network is a low power and lossy network (LLN).

12. The apparatus as in claim 10 wherein the process when executed is further configured to cause the bloom filter to provide an Explicit Identifier in which only a subset of network devices for the nodal path traveled by the data packet is recorded in the bloom filter to mitigate false positives attributable to the bloom filter.

13. The apparatus as in claim 10 wherein the process when executed is further configured to record in the bloom filter the nodal path the data packet traverses in the computer network between the source network device and the destination network device.

14. The apparatus as in claim 10 wherein the process when executed is further configured to cause the recorded nodal path to record the order of network devices traversed by the data packet in the computer network.

15. A tangible, non-transitory, computer-readable media having software encoded thereon, the software when executed by a processor operable to:
generate a bloom filter in a data packet, wherein the bloom filter includes a hop count field that indicates a number of hops the data packet has travelled from a source network device, an integer K indicative of the number of hash functions to use for the bloom filter, and a bit-vector field for encoding the bloom filter; and
record in the bloom filter an encoded identifier of each network device along a nodal path that the data packet traverses and a corresponding hop count from a source network device for each network device along the nodal path,
wherein the nodal path recorded in bloom filter is updated en-route as the data packet traverses the nodal path in the computer network,
wherein each network device along the nodal path increments the hop count field to record the number of hops the data packet traverses from the source network device to a destination network device.

* * * * *

UNITED STATES PATENT AND TRADEMARK OFFICE
CERTIFICATE OF CORRECTION

PATENT NO. : 9,455,903 B2  
APPLICATION NO. : 13/563573  
DATED : September 27, 2016  
INVENTOR(S) : Jonathan W. Hui et al.

Page 1 of 1

It is certified that error appears in the above-identified patent and that said Letters Patent is hereby corrected as shown below:

In the Specification

Column 6, Line 67, please amend as shown:
"RPL Objective Function 0 <draft-ietf-roll-of0-15> by Column 8, Line 1, please amend as shown:
if one exists). These selected links form the DAG 410

Column 10, Line 44, please amend as shown:
3) BF | =Filter("2|C), mode C updates the filter with Hop Column 11, Line 22, please amend as shown:
2) BF|=Filter("1|B"), node B updates the filter with Hop Signed and Sealed this  
Eleventh Day of June, 2019

Andrei Iancu  
*Director of the United States Patent and Trademark Office*